Figure 1:
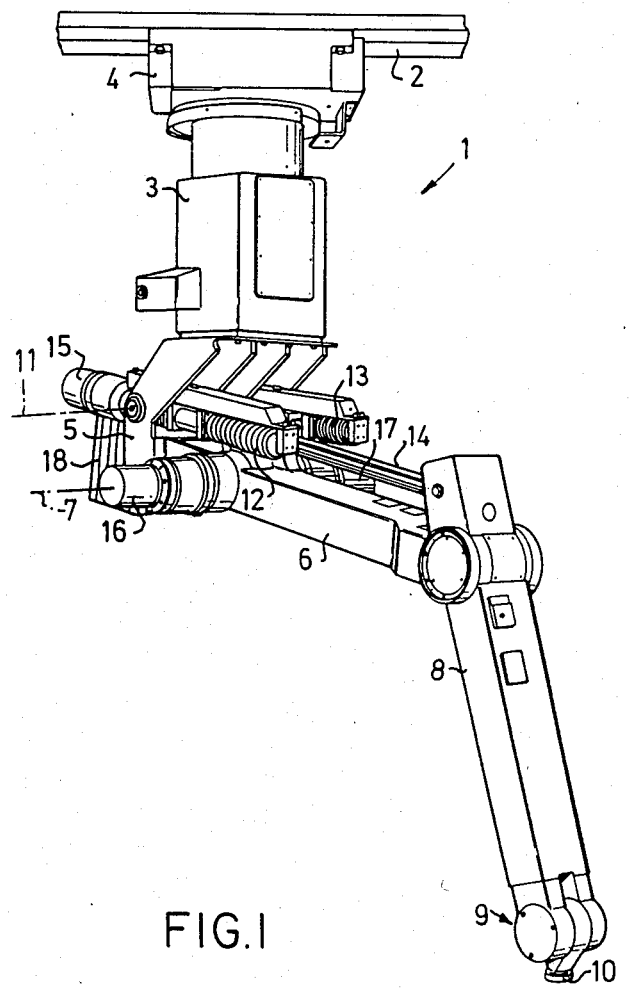

United States Patent [19]

Kaufmann et al.

[11] Patent Number: 4,668,155
[45] Date of Patent: May 26, 1987

[54] INDUSTRIAL ROBOT

[75] Inventors: Herbert Kaufmann; Torbjörn Forss, both of Västerås, Sweden

[73] Assignee: Asea AB, Västerås, Sweden

[21] Appl. No.: 778,662

[22] Filed: Sep. 23, 1985

[30] Foreign Application Priority Data

Sep. 24, 1984 [SE] Sweden ................................ 8404770

[51] Int. Cl.⁴ ............................................. B66C 23/00
[52] U.S. Cl. .................... 414/680; 414/735; 414/917; 901/19; 901/18; 901/15
[58] Field of Search .............. 414/917, 680, 735; 901/15, 18, 19, 22–24

[56] References Cited

U.S. PATENT DOCUMENTS

| 4,275,986 | 6/1981 | Engelberger et al. | 901/22 X |
| 4,482,288 | 11/1984 | Rovetta | 901/18 X |
| 4,501,522 | 2/1985 | Causer et al. | 901/18 X |
| 4,531,885 | 7/1985 | Molaug | 901/22 X |

FOREIGN PATENT DOCUMENTS 3131933 4/1982 Fed. Rep. of Germany .
669435 10/1964 Italy .
427190 5/1983 Sweden .
433585 4/1984 Sweden .

OTHER PUBLICATIONS

ASEA, "Industrial Robot System", Brochure, 9/1976.

Primary Examiner—Robert J. Spar
Assistant Examiner—Jay I. Alexander
Attorney, Agent, or Firm—Watson, Cole, Grindle & Watson

[57] ABSTRACT

The invention relates to an industrial robot of the kind comprising a body and an arm system pivotally journalled thereon. In order to achieve an improved and extended working range in a vertical space underneath or above the robot, the arm system is supported in the body via a substantially fork-shaped bearing bracket. Linear actuators intended for the operation of the arms are pivotally journalled in the bearing bracket so that, when the arm system assumes its neutral position, the actuators will be oriented primarily transversely to the longitudinal axis of a body and substantially parallel with the first arm pivotally journalled in the bearing bracket. Both actuators are disposed between the body and the first arm in all positions of the arm system.

2 Claims, 2 Drawing Figures

INDUSTRIAL ROBOT

The present invention relates to an industrial robot of the kind comprising a body arranged to be rotatably mounted about a longitudinal axis thereof in a support structure, a first arm which is pivotally journalled at one end thereof relative to the body from a neutral position oriented substantially perpendicularly to the longitudinal axis of said body, a second arm which is pivotally journalled at the other end of the first arm, a first linear drive means for turning the first arm relative to the body, and a second linear drive means for turning the second arm relative to the first arm, the one end of the first arm being pivotally journalled in the body via a substantially fork-shaped bearing bracket.

The invention is primarily intended for the implementation of an industrial robot of the above-mentioned type, which is useful in the handling and treatment of workpieces arranged to be displaced along a continuous production path disposed above or underneath the robot, providing in this manner an improved and extended working range in a vertical space beneath the robot when it is mounted suspended in an overhead support structure, or alternatively above the robot when it is mounted in an upright position.

In order to accomplish this object, the industrial robot described in the introduction is distinguished in that both linear drive means are pivotally journalled in the bearing bracket so that, when the first arm assumes its neutral position, both drive means will be oriented primarily transversely to the longitudinal axis of the body and substantially parallel with the first arm. Due to the first arm being journalled as suggested above and both linear drive means in the bearing bracket having the aforementioned specific geometric relationship between the components, there is obtained an improved working range, as compared to previous solutions, in the vertical space located directly above or underneath the robot depending on the point of attachment of the body.

In a preferred embodiment of the invention, the linear drive means are disposed at a point between the body and the first arm, which arrangement promotes the movability of the arm system.

Figure 2:
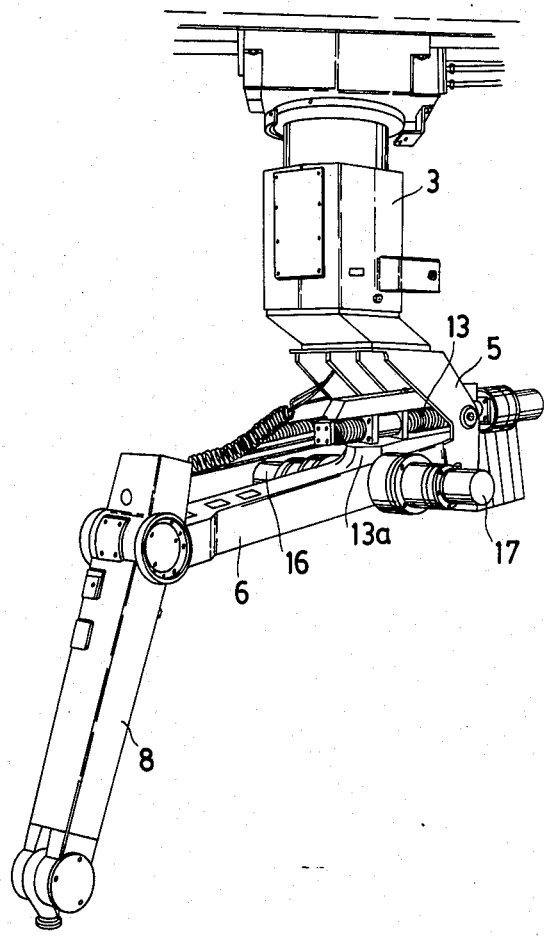

The invention will be described in more detail below while referring to the accompanying drawings, wherein FIGS. 1 and 2 illustrate perspective views of a preferred embodiment of an industrial robot according to the invention.

The embodiment as shown in the drawing relates to an industrial robot 1 intended to be mounted for suspension in an overhead support structure 2. The robot 1 comprises a pillar stand or body 3 which is rotatably journalled in a foot or base 4 anchored in the support structure 2. At its lower end the body 3 carries an angled fork-shaped bearing bracket 5 in which the inner end of a first arm 6 is pivotally journalled around a horizontal axis 7. The arm 6 assumes in its neutral position a substantially horizontal position which is substantially perpendicular to the longitudinal axis of the body 3.

At the outer end of the arm 6 there is furthermore pivotally journalled a second arm 8 which in its neutral position assumes a substantially vertical position. The outer end of the arm 8 carries in a known manner a rotatable wrist 9 which accommodates a rotatable holder or attachment plate 10 intended for tools or other neans for the handling of a workpiece subjected to treatment.

In the bearing bracket 5 there are pivotally journalled around an axis 11 two linear actuators or drive means in the form of ball screws 12 and 13. Ball screw 13 is connected to a moment arm 13a FIG. 2 for turning the first arm 6, the other ball screw 12 being made to turn the outer arm 8 via a tie rod 14. When the arm system 6,8 assumes a neutral position, the ball screws 12,13 are oriented substantially transversely to the longitudinal axis of the body 3 and substantially parallel to the arm 6. As shown in the drawing, the ball screws 12 and 13 are each driven by their own individual electric motor of which one is indicated at 15. Furthermore, the ball screws are preferably journalled in the bearing bracket 5 so as to be accommodated in a space between the body 3 and the arm 6. Alternatively, however, the ball screws can be mounted at the other side of the pivot axis 7, although such an arrangement would involve a certain restriction of the movability of the arm system. The ball screws 12 and 13 can be replaced by equivalent drive mechanisms serving as linear drive means such as toothed wheels and racks, or pressure medium operated piston-cylinder devices.

The industrial robot further includes in a conventional manner an electric motor 16 for turning the wrist via a linakge system (not shown), as well as an electric motor 17 for rotating the attachment plate 10 mounted on the wrist; also in this case via a linkage system (not shown) disposed inside the arms 6 and 8. The motors 16 and 17 are mounted at the center of rotation of the arm 6, said center of rotation suitably being located so that the center line 7 intersects an extension of the longitudinal axis of the body 3. A counterweight indicated at 18 projects rearwardly from the center of rotation 7 of the arm 6 in order to equalize moment forces acting on the arm system 6,8.

Although the embodiment of the invention, illustrated and described in the foregoing, refers to an industrial robot suspended in an overhead support structure and serving the purpose of treating and handling objects which are fed from below to the working range of the robot and fed away therefrom vertically underneath it, the invention is of course equally applicable with the robot mounted in an upright position on an underlying support structure.

We claim:

1. Industrial robot comprising a body arranged to be rotatably mounted about a longitudinal axis thereof in a support structure, a first arm which is pivotally journalled at one end thereof relative to the body from a neutral position oriented substantially at right angles to the longitudinal axis of the body, a second arm which is pivotally journalled at the other end of the first arm, a first linear drive means for turning the first arm relative to the body and a second linear drive means for turning the second arm relative to the first arm, said one end of the first arm being pivotally journalled in the body via a substantially fork-shaped bearing bracket, wherein both said linear drive means are pivotally journalled in the bearing bracket so that, when the first arm assumes its neutral position, both said drive means will be oriented primarily transversely to the longitudinal axis of the body and substantially parallel with the first arm, and wherein both said linear drive means are disposed between the body and the first arm in all positions of the arms.

2. Industrial robot as claimed in claim 1, wherein the second arm, when in its neutral position, is oriented substantially perpendicularly to the first arm and extending from the first arm in a direction away from the body.

* * * * *